United States Patent [19]

Hull

[11] Patent Number: 4,722,736

[45] Date of Patent: Feb. 2, 1988

[54] LOW-DUSTING PARTICULATE SOLID DYE COMPOSITION USING ARYL HYDROXY-POLYALKOXYLATE

[75] Inventor: George Hull, Greater Manchester, England

[73] Assignee: Imperial Chemical Industries PLC, London, England

[21] Appl. No.: 852,112

[22] Filed: Apr. 15, 1986

[30] Foreign Application Priority Data

May 2, 1985 [GB] United Kingdom ................. 8511207

[51] Int. Cl.$^4$ .......................... C09B 67/42; C09K 3/22
[52] U.S. Cl. ............................................. 8/524; 8/526; 8/543; 8/610; 8/918
[58] Field of Search ................... 8/524, 526, 543, 610

[56] References Cited

U.S. PATENT DOCUMENTS

| | | | |
|---|---|---|---|
| 4,295,851 | 10/1981 | Neumann et al. | 8/524 |
| 4,397,652 | 8/1983 | Neumann | 8/524 |
| 4,525,170 | 6/1985 | Balliello | 8/524 |

*Primary Examiner*—A. Lionel Clingman
*Attorney, Agent, or Firm*—Cushman, Darby & Cushman

[57] ABSTRACT

A low-dusting particulate composition comprising (i) a particulate solid, especially a hydrophilic solid, such as a water-soluble dye or surfactant-treated water-insoluble dye, and (ii) an aryl hydroxypolyalkoxylate which is free from long aliphatic substituents.

8 Claims, No Drawings

LOW-DUSTING PARTICULATE SOLID DYE COMPOSITION USING ARYL HYDROXY-POLYALKOXYLATE

This specification describes an invention relating to a particulate solid treated with a de-dusting agent.

It is known to use long chain alkyl benzenes, such as dodecylbenzene and long-chain alkyl esters of long chain carboxylic acids, such a tridecyl stearate, as de-dusting agents, but these compounds have limitations, especially with very dusty solids containing more that about 10–15% of their weight in fines, and furthermore they can cause problems when the solid is dissolved or dispersed in an aqueous medium, as is the case with many solids, such as dyes and pigments, because these agents are not water soluble. It has now been surprisingly found that certain water-soluble aryl polyalkoxylates which are substantially free from long aliphatic chains are effective at reducing dustiness in a powdered solid, particularly where the solid contains a high proportion of dust.

According to the present invention there is provided a low-dusting particulate composition comprising a particulate solid and an aryl hydroxypolyalkoxylate which is free from long-chain aliphatic substituents.

The solid may be any material which is susceptible to dustiness in a dry, particulate form but is preferably a material having a hydrophilic surface such as a water-soluble material or a water-insoluble material with hydrophilic character or surface such as is achieved by treatment with a hydrophilic surfactant. Suitable materials include dyes and pigments, especially water-soluble hydrophilic dyes, such as cellulose-reactive dyes, acid dyes, direct dyes, basic dyes, metal-complex dyes and cationic dyes and water-insoluble colorants such as disperse dyes, vat dyes, pigments, both organic and inorganic. Other suitable materials which may be water-soluble or insoluble and organic or inorganic include inorganic salts and complexes, metal oxides, dry acids and bases, biocides, agrochemicals and pharmaceuticals, especially those which are water soluble or in a water-dispersable form arising from treatment with a hydrophilic surfactant.

By the term "free from long-chain aliphatic substituents" is meant that the aryl hydroxypolyalkoxylate carries no aliphatic groups containing more than four carbon atoms. The aryl hydroxypolyalkoxylate is preferably a liquid mono- or poly-cyclic aryl hydroxypolyalkoxylate in which the aryl group is unsubstituted apart from the polyalkyleneoxy chain. Preferred mono- and poly-cyclic aryl groups are phenyl, tolyl, naphth-1-yl, naphth-2-yl, 2-phenylphenyl, 4-phenylphenyl and dimethylmethylenediphen-4,4'-ylene (i.e. the bivalent radical derived from bis-phenol A by removal of the hydrogewn atoms in the 4,4'-positions). The polyalkyleneoxy chain desirably contains from 3 to 20, preferably from 5 to 15 and more preferably from 8 to 12, alkyleneoxy groups. The polyalkyleneoxy chain is preferably homogeneous and formed from $C_{1-4}$-alkyleneoxy groups, especially ethyleneoxy groups. An especially preferred aryl hydroxypolyalkoxylate is 2-(hydroxydecaethyleneoxy)-naphthalene (2-HDEN). Examples of other suitable aryl hydroxypolyalkoxylates are the condensates of 2-naphthol with 3, 4, 5, 8, 12, 15 and 20 molecular proportions of ethylene oxide, and of 1-naphthol, phenol, 2-, 3- and 4-cresol, 2-phenylphenol, 4-phenyl-phenol, bis-phenol A with 5, 10, 15 and 20 molecular proportions of ethylene oxide.

The solid composition desirably contains from 0.1% up to 10%, preferably from 0.5% to 7.5% and more preferably from 1% to 5%, by weight, of the aryl polyalkoxylate.

The composition is conveniently prepared by applying the aryl hydroxypolyalkoxylate in liquid form to the particulate solid, preferably, though not necessarily, by spraying, and mixing to disperse the agent throughout the solid. Mixing is preferably by gentle means such as tumbling the ingredients together but in some cases a greater reduction in dustiness can be achieved by more vigorous shaking of the ingredients.

The invention is further illustrated by the following examples in which all parts and percentages are by weight unless otherwise indicated.

EXAMPLE 1

To three samples of CI Reactive Blue 171 in cylindrical glass bottles were added 2% by weight of dodecylbenzene, tridecyl stearate and 2-HDEN, respectively, and each bottle was rolled for 1 hour. The level of dust in each sample was then assessed by blowing air through a bed of the treated sample until the weight was constant and measuring the weight of material removed in the air stream.

EXAMPLES 2 TO 7

The procedure of Example 1 was repeated with a further six reactive dyes, CI Reactive Orange 12, Red 3:1, Green 19, Blue 139, Blue 187 and Red 219. The results of the assessments of Examples 1 to 7 are set out in Table 1.

TABLE 1

| | | % Sample removed as Dust for each Agent | | |
|---|---|---|---|---|
| Ex | Dye | Dodecyl benzene | Tridecyl stearate | 2-HDEN |
| 1 | CI R Blue 171 | 0.1 | 0.3 | 0 |
| 2 | CI R Orange 12 | 22.0 | 12.0 | 3.0 |
| 3 | CI R Red 3:1 | 0 | 0 | 0 |
| 4 | CI R Green 19 | 1.4 | 1.0 | 0 |
| 5 | CI R Blue 139 | 5.0 | 2.0 | 0.5 |
| 6 | CI R Blue 187 | 1.4 | 0 | 0.3 |
| 7 | CI R Red 219 | 7.0 | 13.0 | 0.2 |

EXAMPLE 8

To a sample of CI Vat Violet 1 in a cylindrical glass bottle was added 2% by weight of 2-HDEN and the bottle was shaken vigorously for 5 minutes in a figure of eight movement. The level of dust in the sample was then assessed by blowing air through a bed of the treated sample until the weight was constant and measuring the weight of material removed in the air stream. The procedure was repeated omitting the addition of 2-HDEN. The results of the dust determinations with and without the presence of 2-HDEN are given in Table 2.

EXAMPLES 9 TO 17

The procedure of Example 8 was repeated with each of the solids listed in Table 2 in place of CI Vat Violet 1, and the results of the dust determinations on each solid, with and without the present of 2-HDEN, are given in Table 2.

TABLE 2

| Ex | Solid | % Sample removed as Dust | |
|---|---|---|---|
| | | Untreated | Treated (2% 2-HDEN) |
| 8 | CI Vat Violet 1 | 11.1 | 7.3 |
| 9 | CI Vat Black 27 | 3.0 | 0 |
| 10 | 30% CI Disperse Blue 291) 70% CI Disperse Violet 93:1) | 6.1 | 1.5 |
| 11 | CI Disperse Blue 79 | 5.0 | 0 |
| 12 | CI Disperse Brown | 5.0 | 0 |
| 13 | CI Pigment Yellow 34 | 2.6 | 1.0 |
| 14 | CI Pigment Red 104 | 4.1 | 0.5 |
| 15 | Diuron | 2.0 | 0 |
| 16 | TCMSP | 10.0 | 0 |
| 17 | THBCPP | 17.0 | 1.5 |

TCMSP is 2,3,5,6-tetrachloro-4-(methylsulphonyl)-pyridine
THBCPP is 1-triazolyl-2-hydroxy-2-t-butyl-3-(2-chlorophenyl)-propane

EXAMPLE 18

To a sample of the untreated CI Reactive Red 219 used in Example 7 above (11.0% dust), in a cylindrical glass bottle, was added 4% by weight of 2-HDEN and the bottle was shaken vigorously for 5 minutes in a figure of eight movement. The level of dust in the sample was then assessed by blowing air through a bed of the treated sample until the weight was constant and measuring the weight of material removed in the air stream. The % dust treated with 4% by weight of 2-HDEN is given in Table 3.

EXAMPLES 19 TO 26

The procedure of Example 18 was repeated except that in each Example the 4% by weight of 2-HDEN was replaced by 4% by weight of an aryl hydroxypolyaloxylate made by condensation of an arol listed in Table 3 with the indicated molecular proportion of ethylene oxide (+n EO). The % dust in CI Reactive Red 219 treated with 4% by weight of each aryl polyalkoxylate are given in Table 3.

TABLE 3

| Ex | Aryl Polyalkoxylate | % Dust |
|---|---|---|
| Control | None | 11.0 |
| 18 | 2-HDEN | 0 |
| 19 | Phenol + 10 EO | 0 |
| 20 | Phenol + 4 EO | 0 |
| 21 | 2-Naphthol + 3 EO | 1.0 |
| 22 | 2-Cresol + 10 EO | 0 |
| 23 | 2-Phenylphenol + 10 EO | 0 |
| 24 | Bisphenol A + 15 EO | 0 |
| 25 | Phenol + 5 EO | 0 |
| 26 | 2-Naphthol + 15 EO | 0.5 |

EXAMPLE 27

To a mixture of CI Mordant Blue 1 and CI Mordant Blue 13 in a cylindrical glass bottle was added 1% by weight of 2-HDEN and the bottle was shaken vigorously for 5 minutes in a figure of eight movement. The level of dust in the sample was then assessed by blowing air through a bed of the treated sample until the weight was constant and measuring the weight of material removed in the air stream. The procedure was repeated omitting the addition of 2-HDEN. The results of the dust determinations with and without the presence of 2-HDEN are given in Table 4.

EXAMPLES 28 TO 42

The procedure of Example 27 was repeated with each of the solids listed in Table 4 in place of the mixture of CI Mordant Blue 1 and CI Mordant Blue 13 and the indicated quantity of 2-HEDN. The results of the dust determinations on each solid, with and without the presence of 2-HDEN, are given in Table 4.

TABLE 4

| | | % Sample removed as Dust | | |
|---|---|---|---|---|
| Ex | Solid | Untreated | Treated | % 2-HDEN |
| 27 | CI Mordant Blues 1 & 13 | 0.8 | 0.4 | 1 |
| 28 | CI Acid Blue 62 | 20.0 | 6.0 | 4 |
| 29 | CI Acid Red 266 | 41.0 | 0.6 | 2 |
| 30 | CI Reactive Blue 4 | 22.0 | 0 | 3 |
| 31 | CI Reactive Blue 72 | 0.9 | 0 | 1 |
| 32 | CI Reactive Red 218 | 3.0 | 0 | 4 |
| 33 | CI Reactive Red 2 | 20.0 | 17.0 | 4 |
| 34 | CI Reactive Red 123 | 0.8 | 0 | 1 |
| 35 | CI Reactive Violet 23 | 1.0 | 0 | 2 |
| 36 | BAPDPS | 11.0 | 4.0 | 4 |
| 37 | 1,3,6-trihydroxy-xanthone | 1.6 | 0 | 1 |
| 38 | DCAN | 0.6 | 0 | 1 |
| 39 | Titanium Dioxide | 9.0 | 0 | 4 |
| 40 | CI Reactive Blue 19 | 1.0 | 0 | 1 |
| 41 | CI Reactive Blue 77 | 16.0 | 0.4 | 4 |
| 42 | Potassium Dichromate | 2.9 | 0 | 2 |

BAPDPS is 4,4'-bis-(3-aminophenoxy)-diphenylsulphone
DCAN is Dicyclohexylammonium nitrate

I claim:
1. A low-dusting particulate composition consisting essentially of a particulate solid due and an unsubstituted aryl hydroxypolyalkoxylate.
2. A composition according to claim 1 wherein the particulate solid dye has a hydrophilic surface.
3. A composition according to claim 1 wherein the solid dye is a cellulose-reactive dye.
4. A composition according to claim 1 wherein the aryl group in the aryl hydroxypolyalkeneoxylate is selected from phenyl, naphth-1-yl, naphth-2-yl, 2-phenylphenyl, and 4-phenylphenyl.
5. A composition according to claim 1 wherein the aryl hydroxypolyalkoxylate contains from 3 to 20 alkyleneoxy groups.
6. A composition according to claim 1 wherein the alkeneoxy group is ethyleneoxy.
7. A composition according to claim 1 wherein the aryl hydroxypolyalkoxylate is 2-(hydroxydecaethyleneoxy)-naphthalene.
8. A composition according to claim 1 containing from 0.1% to 10% by weight of the aryl hydroxypolyalkoxylate.

* * * * *